Nov. 18, 1958     R. J. LINDSEY     2,860,485
ACCUMULATOR SYSTEM WITH CENTRIFUGAL PUMP
Filed June 2, 1955
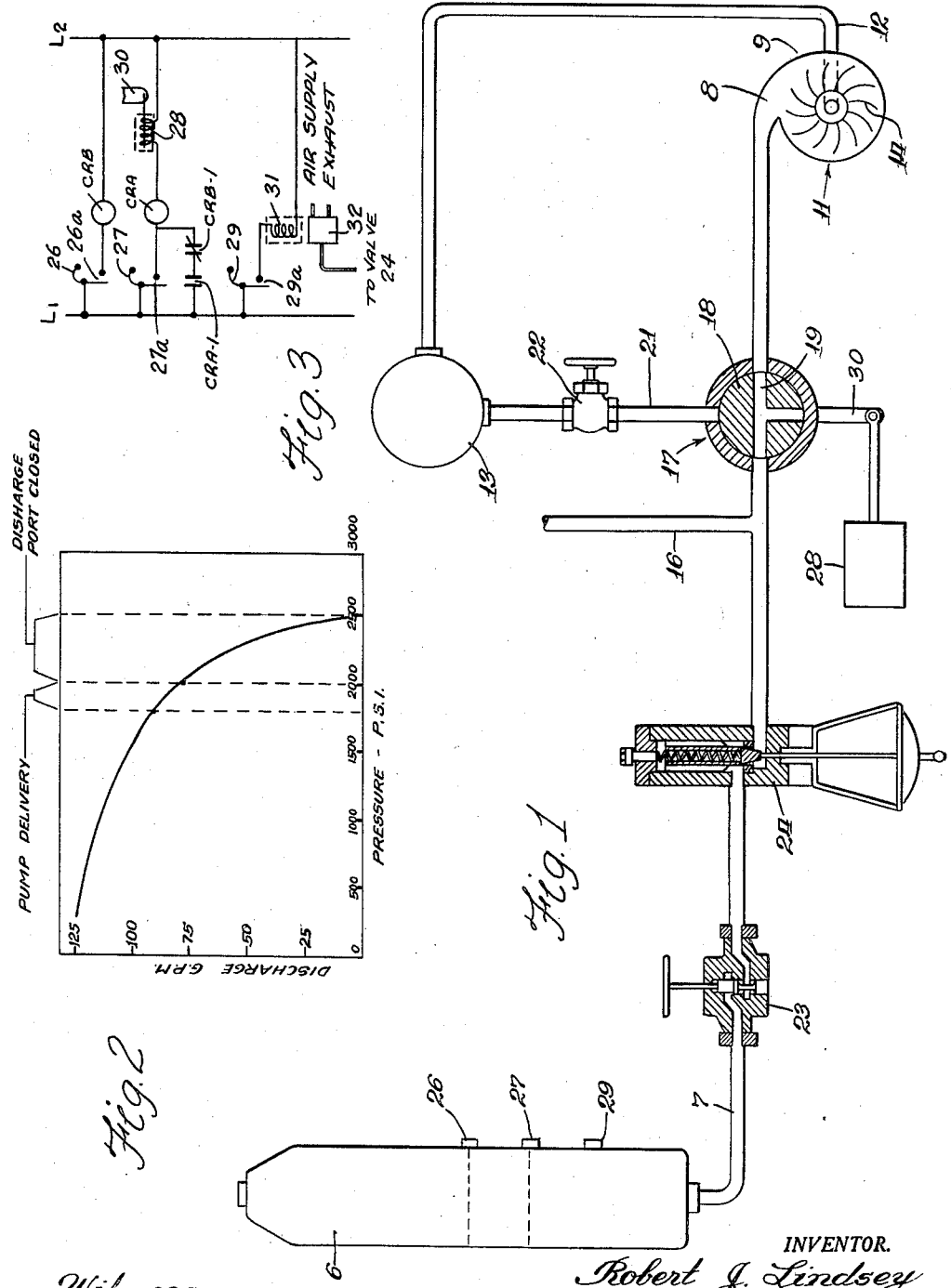
INVENTOR.
Robert J. Lindsey
BY
Walter L. Schlegel, Jr. Atty.
Witness:
Charles H. Barrett United States Patent Office 2,860,485
Patented Nov. 18, 1958

2,860,485

ACCUMULATOR SYSTEM WITH CENTRIFUGAL PUMP

Robert J. Lindsey, Cincinnati, Ohio, assignor to American Steel Foundries, Chicago, Ill., a corporation of New Jersey Application June 2, 1955, Serial No. 512,691

6 Claims. (Cl. 60—51)

This invention relates to gas-ballasted accumulator systems adapted to maintain a supply of liquid under pressure for use with various types of apparatus such as, for example, hydraulic presses.

An object of the invention resides in the provision of an accumulator system embodying a centrifugal pump for maintaining a supply of liquid under pressure within an accumulator vessel.

Another object of the invention resides in the provision of an accumulator system embodying control means for maintaining the supply of liquid in the vessel within certain minimum and maximum levels and pressure limits.

A further object of the invention resides in the provision of an accumulator system in which the centrifugal pump is effective to immediately deliver a substantial volume of liquid to the vessel to maintain the liquid supply therein above a predetermined minimum level or pressure limit to prevent automatic shut-off of the system.

Another object of the invention resides in the provision of an accumulator system in which the control means embodies a 3-way valve operative to direct the flow of liquid from the centrifugal pump through a bleed-off pipe leading back to a liquid supply reservoir when the liquid in the accumulator vessel reaches a predetermined maximum level or pressure limit, said pipe being provided with a needle valve or the like to restrict the flow of liquid therethrough to cause the pump discharge pressure to gradually increase until it reaches the maximum or rated capacity of the pump, at which point the horse power required to operate the pump is materially reduced as the impellers merely churn the liquid within the pump casing. When the liquid level or pressure in the vessel drops to a predetermined minimum limit, the 3-way valve is actuated to direct the flow of liquid from the pump to the vessel, the pump being capable of supplying a relatively large volume of liquid to the vessel at the predetermined minimum pressure limit to thereby satisfy any abnormal discharge of liquid from the vessel to a hydraulic press or the likes.

The invention embodies other novel features, details of construction and arrangement of parts which are hereinafter set forth in the specification and claims and illustrated in the accompanying drawing, wherein:

Figure 1 is a diagrammatic view illustrating an accumulater system embodying features of the invention;

Figure 2 illustrates a typical performance curve for a cenrtifugal pump; and

Figure 3 illustrates an electrical wiring diagram for controlling the accumulator system.

Referring now to the drawing for a better understanding of the invention, the accumulator system is shown as comprising a hollow vessel 6 adapted to be filled with gas under pressure from any suitable source and then partially filled with liquid through an outlet pipe 7 connected to the tangential outlet 8 in the housing 9 of a conventional centrifugarl pump 11. An inlet pipe 12 is provided to conduct liquid from a supply tank or reservoir 13 to an axial inlet provided in the pump housing 9.

A suitable impeller 14 is journaled for rotational movement within the housing 9 and adapted to be driven by an electric motor (not shown) to force fluid from the reservoir 13 through the outlet pipe 7 into the vessel 6, or through the outlet pipe 7 and branch outlet pipe 16 to a hydraulic press or other fluid actuated apparatus (not shown).

A 3-way valve 17 is interposed in the outlet pipe 7 between the pump 11 and branch outlet pipe 16 and provided with a rotatable valve member 18 having a passageway 19 therethrough, said member being movable between open and by-pass positions to control the flow of liquid through the outlet pipe to the vessel 6. When the valve member 18 is in its by-pass position, the passageway 19 serves to direct liquid from the pump 11 through a bleed-off pipe 21 to the reservoir 13, the flow of liquid through the pipe 21 being restricted by means of a needle valve 22.

A stop valve 23 is provided in the outlet pipe 7 between the vessel 6 and branch outlet pipe 16; and a safety closing valve 24 is provided in the pipe 7 between the stop valve 23 and branch outlet pipe 16. As the construction and operation of the safety closing valve 24 is illustrated and described in detail in Patent 2,294,396, granted September 1, 1942, to R. J. Feuchter, for use in an accumulator system, and serves in the same manner in the present system, a further detail description of same is not essential to an understanding of the present invention. Briefly, the safety closing valve 24 is opened automatically to permit a flow of liquid from the pump 11 to the vessel 6 when the liquid level or pressure limit in the latter falls below a certain minimum operating limit, and is closed automatically to serve as a check valve to prevent withdrawal of liquid from the vessel in the event of failure of proper operation of the system.

The 3-way valve member 18 is adapted to be moved to either open or by-pass position by any suitable control means operable responsive to variations in liquid level or pressure limits within the vessel 6. The control means may, for example, comprise pressure or volume responsive switches, indicated generally at 26 and 27, electrically connected to a solenoid 28 adapted to directly or indirectly actuate the 3-way valve 17.

The switch 27 is provided to complete an electrical circuit to the solenoid 28 to open the 3-way valve 17 when the liquid level or pressure in the vessel drops to a predetermined minimum limit, thereby permitting the pump 11 to supply liquid from the reservoir 13 to the vessel. When the liquid level or pressure in the vessel is raised to the predetermined maximum limit the switch 26 operates through an electrical circuit and solenoid 28 to move the 3-way valve to its bleed-off position, thereby directing the liquid from the pump 11 through the restricted bleed-off pipe 21 back to the reservoir 13. When the liquid level or pressure in the vessel is between maximum and minimum limits, liquid is supplied from the vessel through the pipe 7 and branch pipe 16 to a hydraulic press or other apparatus to be actuated by the liquid, in which event the valves 23 and 24 are, of course, in their open positions.

After the 3-way valve member 18 is moved to its bleed-off position to discharge liquid from the centrifugal pump 11 through the restricted bleed-off pipe 21 back to the reservoir 13, the pump discharge pressure gradually increases until it reaches the maximum capacity of the pump, at which point the impeller 14 acts to churn the liquid within the pump housing 9 and the horse power required to rotate the impeller is materially reduced as the pump is performing little useful work in discharging liquid into the system. The heat generated within the pump by the churning action is dissipated by the flow of the small quantity of liquid from the pump through the bleed-off pipe 21.

In the operation of an accumulator system of the type thus shown and described, it is contemplated that the pressure capacity of the centrifugal pump 11 shall be substantially greater than the maximum pressure limit provided for the system whereby the pump is operative to supply a substantial volume of liquid into the system between the maximum and minimum pressure limits thereof in order to immediately satisfy any abnormal demand or discharge of liquid from the system to hydraulic presses or other hydraulic apparatus when the 3-way valve member 18 is moved from its bleed-off position to its open position, shown in Figure 1.

Figure 2 shows a typical performance curve for a centrifugal pump and it will be noted from the curve that the volume decreases rapidly as the pressure approaches the shut-off pressure of the pump. In the event the pump is unable to satisfy an abnormal discharge of liquid from the system, the liquid level and pressure in the vessel is lowered to actuate a pressure or level responsive switch 29 operative through suitable control means to close the safety closing switch 24 and thus discontinue the operation of the system.

To prevent closing of the safety closing valve 24 and shutdown of the system, the switches 26 and 27 are adapted to act through their respective circuits and solenoid 28 to actuate the 3-way valve between certain level and pressure limits whereby the centrifugal pump is effective to supply the system with liquid in sufficient quantities to meet the requirement of the hydraulic apparatus associated with the system. For example, as illustrated in Figure 2, the switch 26 may be operated to close the 3-way valve 17 when the pressure reaches 2,000 p. s. i. in the vessel 6; and the switch 27 may be operated to open the valve 17 when the pressure in the vessel drops to 1800 p. s. i. A centrifugal pump 11 having a shut-off pressure rating of 2500 p. s. i. would thus deliver approximately 80 gal. per minute at 2000 p. s. i. and approximately 95 gal. per minute at 1800 p. s. i.

Figure 3 illustrates an electrical circuit which may be employed to control the valves 17 and 24. In the circuit, switch 26 is wired in series with the coil of a control relay CRB; switch 27 is wired in series with the coil of a control relay CRA and the coil of a solenoid 28; switch 29 is wired in series with the coil 31 of a solenoid operated air valve 32.

When the pressure in vessel 6 reaches a predetermined low limit, contacts 27a of switch 27 are closed to complete a circuit to energize the coil of relay CRA and also the coil of solenoid 28. Energizing solenoid 28 actuates a control lever 30 to move valve member 18 of valve 17 to open position as explained heretofore. The pressure in the system almost immediately equalizes itself and the pump delivers fluid through the supply pipe 7 at a high rate of flow.

Energizing the coil of relay CRA closes the normally open contact CRA–1 to complete a holding circuit through solenoid 28 so that the valve 17 will remain in open position even though the pressure in vessel 6 may increase a sufficient amount to cause the contacts 27a to open.

When the pressure in vessel 6 reaches a predetermined high limit, the contacts 26a of switch 26 are closed to complete a circuit through the coil of relay CRB thereby opening normally closed contacts CRB–1 to de-energize solenoid 28. Solenoid 28 now actuates the control lever 30 to move the valve member 38 to the bleed-off or by-pass position as explained previously.

When the pressure in vessel 6 falls below a minimum safe operating level, the contacts 29a of switch 29 close to complete a circuit to energize the coil 31 of a solenoid operated air valve 32. The air valve 32 is thereby operated to exhaust air from the diaphragm of valve 24 thereby closing this valve to prevent withdrawal of liquid from the vessel 6. Conversely, when the pressure once again increases to a value above the minimum safe operating level, contacts 29a are opened and air is admitted to the diaphragm of valve 24, and, as a consequence, valve 24 opens.

Condition responsive switches 26, 27 and 29 are illustrated in Figure 3 as pressure responsive switches, but the functioning of the system would be similar to that explained above if these switches had been volume responsive. It will be understood that the illustrated control system is given by way of example only and that many other control systems could be utilized as readily without affecting the operation of the hydraulic system wherein lies the inventive subject matter.

I claim:

1. In an accumulator system, the combination of an accumulator vessel to receive a charge of liquid under pressure; a centrifugal pump having an inlet and having a discharge opening for delivering liquid under pressure into said vessel; a liquid supply pipe interconnecting the discharge opening and the vessel; a branch pipe connected to the supply pipe for conveying liquid therefrom to an associated apparatus for using the liquid; a by-pass pipe connected to the supply pipe upstream of said branch pipe for by-passing said liquid therefrom; by-pass valve means movable to open and by-pass positions for accommodating fluid flow to said vessel and to said by-pass pipe, respectively; means responsive to condition of fluid in said vessel for actuating said valve means to open position when the condition of liquid in the vessel reaches a predetermined low limit and for actuating said valve means to by-pass position when the condition of liquid in the vessel reaches a predetermined high limit; and bleeder valve means in said by-pass pipe for developing sufficient pressure in said discharge opening to reduce output of the pump when said by-pass valve means are in by-pass position, said bleeder valve means accommodating limited flow of liquid from the discharge pump to prevent overheating thereof.

2. In an accumulator system, the combination of a vessel to receive a charge of liquid under pressure; a centrifugal pump having an inlet and having a discharge opening for delivering liquid under pressure into said vessel, the maximum capacity of said pump being substantially higher than the maximum capacity of the accumulator system; a liquid supply pipe interconnecting said pump and vessel; valve means in said supply pipe movable to open and by-pass positions; a branch pipe connected to the supply pipe for conveying liquid therefrom to an associated apparatus for using said liquid; a by-pass pipe upstream of said branch pipe; high pressure responsive means for moving said valve to by-pass position to cut off flow of liquid to said vessel and to accommodate flow of liquid to the by-pass pipe; low pressure responsive means for moving said valve to open position to permit immediate rapid flow of liquid to said vessel; and a bleeder valve in said by-pass pipe for accommodating bleeding flow through the latter.

3. In an accumulator system, the combination of a vessel to receive a charge of liquid under pressure; a centrifugal pump having an inlet and having a discharge opening for delivering liquid under pressure into said vessel; a liquid supply pipe interconnecting said pump and vessel; valve means in said supply pipe movable to open and by-pass positions; a branch pipe connected to the supply pipe for conveying liquid therefrom to associated hydraulic equipment; a by-pass pipe upstream of said branch pipe; means responsive to a predetermined maximum pressure in said vessel for moving said valve to by-pass position for shutting off fluid flow to said vessel and accommodating build-up of pressure and decrease of fluid flow in said by-pass pipe; other means responsive to a predetermined minimum pressure in said vessel for moving said valve to open position whereby immediate high rate fluid flow will occur from said pump to said vessel; and a bleeder valve in said by-pass pipe for accommodating bleeding flow through the latter; the maximum pressure capacity of said pump being substantially greater than the maximum pressure in said vessel.

4. In an accumulator system for delivering fluid under pressure to hydraulic machinery, the combination of a vessel for receiving fluid under pressure; a fluid supply pipe for conveying said fluid to and from the vessel; a branch pipe leading from said supply pipe for delivering fluid to said machinery; a centrifugal pump for supplying fluid under pressure through said supply pipe to said vessel and said branch pipe; a by-pass pipe for receiving fluid from said supply pipe at a point upstream of said branch pipe; a 3-way valve interconnecting said supply pipe and said by-pass pipe; means responsive to a fluid condition of a predetermined maximum value in said vessel for actuating said valve to a position to cut off flow to said vessel and permit flow of fluid to said by-pass pipe; means responsive to a fluid condition of a predetermined minimum value in said vessel for actuating said valve to a position to cut off flow through said by-pass pipe and permit immediate large volume flow through said supply pipe; and means for accommodating continuous throttled flow of liquid through said by-pass pipe.

5. An accumulator system according to claim 4 wherein said means are responsive to predetermined maximum and minimum fluid pressures.

6. An accumulator system according to claim 4 wherein said means are responsive to predetermined maximum and minimum fluid volumes.

References Cited in the file of this patent
UNITED STATES PATENTS

| | | |
|---|---|---|
| 920,825 | Clark | May 4, 1909 |
| 2,275,963 | Herman | Mar. 10, 1942 |
| 2,294,396 | Feuchter | Sept. 1, 1942 |
| 2,331,337 | Meyer | Oct. 12, 1943 |
| 2,345,531 | DeGanahl | Mar. 28, 1944 |
| 2,674,092 | Gardiner | Apr. 6, 1954 |